US007032904B2

(12) United States Patent
Rogers

(10) Patent No.: US 7,032,904 B2
(45) Date of Patent: Apr. 25, 2006

(54) INNER AIR SEAL ANTI-ROTATION DEVICE

(75) Inventor: Mark John Rogers, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 32 days.

(21) Appl. No.: 10/640,225

(22) Filed: Aug. 13, 2003

(65) Prior Publication Data

US 2005/0035559 A1 Feb. 17, 2005

(51) Int. Cl.
*F16J 15/447* (2006.01)

(52) U.S. Cl. ..................... 277/411; 277/414; 415/173.1

(58) Field of Classification Search ................ 277/616, 277/630, 637, 641, 411, 414; 415/173.1, 415/170.1

See application file for complete search history.

(56) References Cited

U.S. PATENT DOCUMENTS

| | | | | |
|---|---|---|---|---|
| 4,897,021 | A * | 1/1990 | Chaplin et al. | 415/173.7 |
| 5,226,788 | A * | 7/1993 | Fledderjohn | 415/177 |
| 5,346,362 | A * | 9/1994 | Bonner et al. | 415/191 |
| 6,042,334 | A * | 3/2000 | Schilling | 415/173.7 |
| 6,435,820 | B1 * | 8/2002 | Overberg | 415/138 |
| 6,464,232 | B1 * | 10/2002 | Marchi et al. | 277/630 |
| 6,464,457 | B1 * | 10/2002 | Morgan et al. | 415/174.2 |
| 6,901,821 | B1 * | 6/2005 | Torrance et al. | 403/20 |

* cited by examiner

*Primary Examiner*—Vishal Patel
(74) *Attorney, Agent, or Firm*—Bachman & LaPointe, P.C.

(57) ABSTRACT

An anti-rotation device for preventing rotation of a damper spring and an inner air seal in a stator assembly is provided. The anti-rotation device is formed by a lug positioned within a slot at a center of an inner air seal arc segment. The lug engages a slot in the damper spring and a cutout in a stator segment so as to prevent rotation of the damper spring and the inner air seal in either direction relative to the stator assembly.

5 Claims, 2 Drawing Sheets

INNER AIR SEAL ANTI-ROTATION DEVICE

BACKGROUND OF THE INVENTION

The present invention relates to a stator assembly having a device for preventing high pressure compressor inner air seals and damper springs from rotating relative to high pressure compressor stator clusters.

A damped high pressure compressor (HPC) stator design typically consists of a number of stator cluster assemblies arranged in a full ring and fitted into an HPC inner case between HPC rotor stages. Each stator cluster typically consists of an inner air seal with brazed on honeycomb, a damper spring, and two or three stator clusters which are assembled over the damper springs and inner air seals. The stator clusters are loaded circumferentially by gas load and are anti-rotated relative to the inner case by an anti-rotation device at the outer shroud. The inner air seals and damper springs are subject to loading that causes them to rotate circumferentially relative to the stator clusters. This rotation must be prevented otherwise the inner air seals and damper springs could move off the ends of the stator segments and lock under the adjacent stator assemblies and prevent radial disassembly. The direction of rotation of these parts is unpredictable and can be in either direction.

SUMMARY OF THE INVENTION

Accordingly, it is an object of the present invention to provide a device which prevents rotation of the inner air seals and damper springs in either direction relative to the stator assembly.

The foregoing object is attained by the system of the present invention.

In accordance with the present invention, an anti-rotation device for preventing rotation of a damper spring and an inner air seal in a stator assembly is provided. The device broadly comprises a lug positioned within a slot at a center of an inner air seal arc segment, which lug engages a slot in the damper spring and a cutout in a stator segment so as to prevent rotation of the damper spring and the inner air seal in either direction relative to the stator assembly.

The present invention also relates to a stator assembly which broadly comprises a number of stator cluster assemblies arranged in a full ring and fitted into an inner case, each stator cluster assembly having an inner air seal, a damper spring, and a plurality of stator clusters assembled over the damper spring and the inner air seal, and each stator cluster assembly further having a single, centrally located means for preventing rotation of the damper spring and the inner air seal relative to the stator clusters.

Other details of the inner air seal anti-rotation device of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
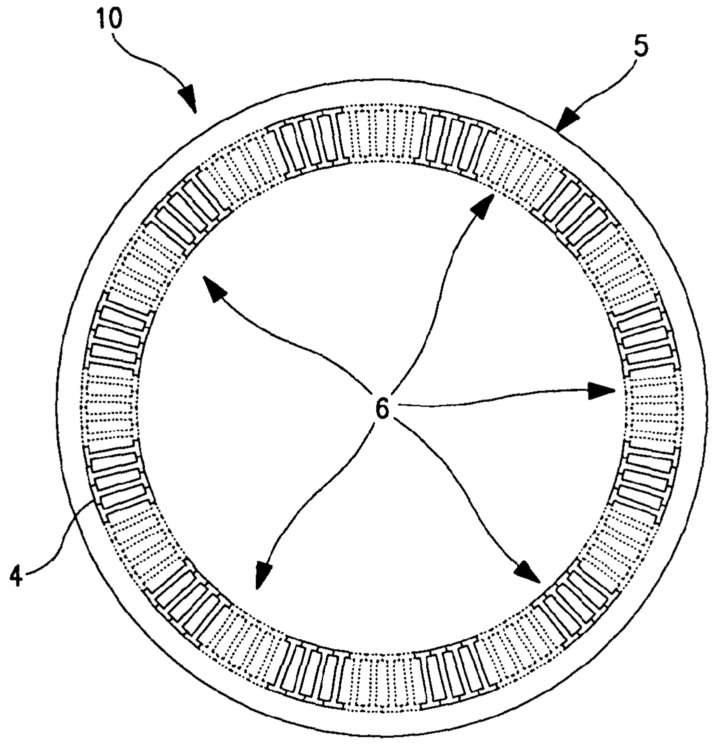
FIG. 1 is a schematic representation of a damped HPC stator assembly.
Figure 2:
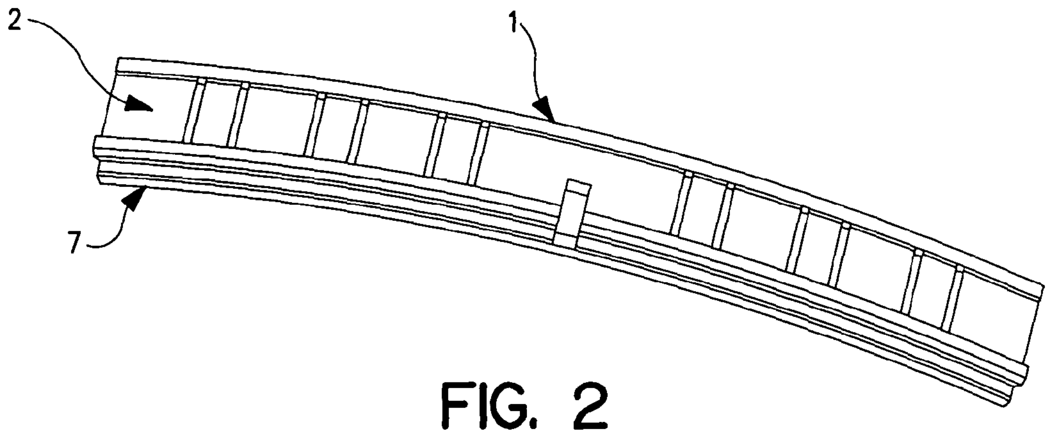
FIG. 2 illustrates a stator cluster used in the assembly of FIG. 1.
Figure 3:
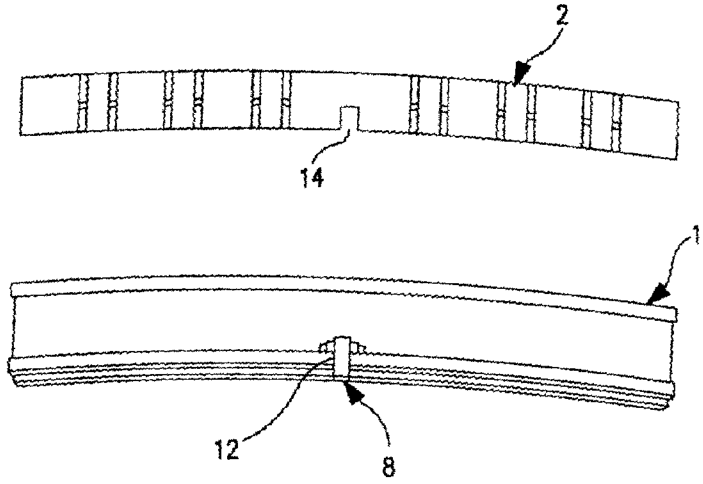
FIG. 3 is an exploded view showing the anti-rotation device of the present invention and a damper spring.

Referring now to the drawings, FIG. 1 illustrates a damped HPC stator assembly 10 consisting of a number of stator cluster assemblies 4 arranged in a full ring 6 and fitted into a HPC inner case 5 between HPC rotor stages. As shown in FIGS. 2 and 3, each stator cluster has an inner air seal 1 with brazed on honeycomb 7, a damper spring 2, and two or three stator clusters 3 which are assembled over the damper springs 2 and inner air seals 1. The stator clusters 3 are loaded circumferentially by gas load and are anti-rotated relative to the inner case 5 by an anti-rotation device (not shown) at the outer shroud.

Figure 4:
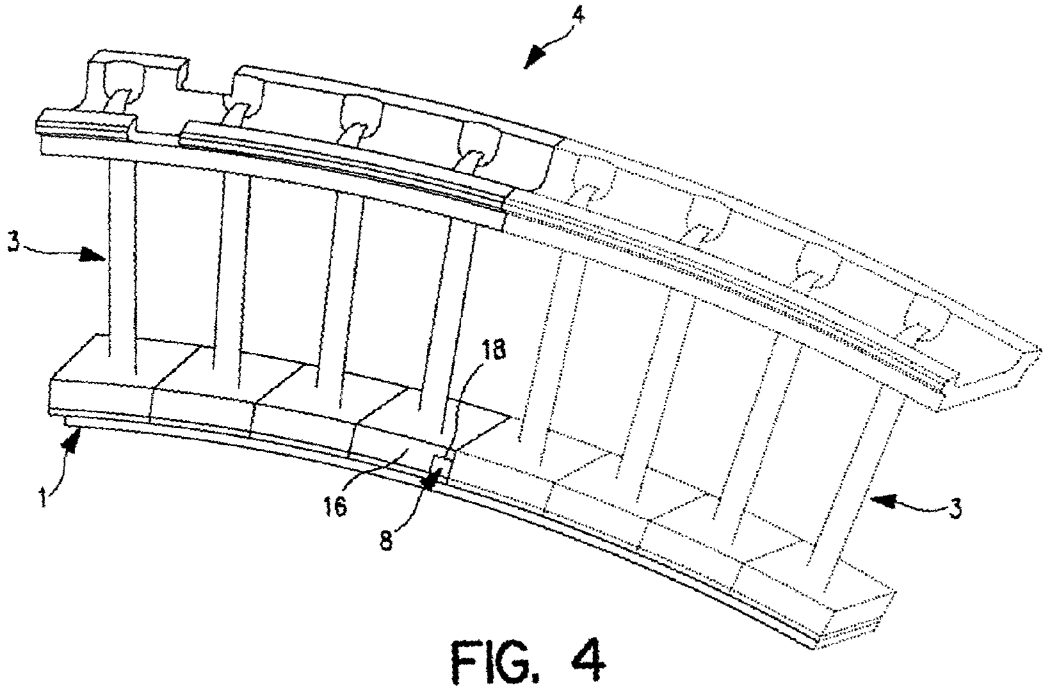
FIG. 4 is a view showing the anti-rotation device of the present invention and the inner air seals

Referring now to FIGS. 3 and 4, the anti-rotation device 8 of the present invention is formed by a lug that is brazed into a slot 12 in the center of an inner air seal arc segment 1. The device 8 performs a dual anti-rotation function as follows.

As shown in FIG. 3, the lug 8 prevents the damper springs 2 from rotating circumferentially relative to the inner air seals 1. This is achieved by the lug 8 protruding radially outboard from the surface of the inner air seal 1 to engage a slot 14 in the damper spring 2.

The lug 8 also prevents the inner air seals 1 from rotating circumferentially relative to the stator clusters 3. As shown in FIG. 4, this is accomplished by the lug 8 protruding axially forward through the inner air seal front face 16 to engage in a cutout 18 in one stator segment. The lug 8 is therefore trapped between two stator clusters and thereby prevents the inner air seal 1 rotating in either direction relative to the stator clusters 3.

The lug 8 preferably has a T-shaped profile that fits into the slot 12 which is also preferably T-shaped. This provides increased surface area for braze as well as secondary retention. The lug 8 is fully trapped in the assembly if the braze were to fail. If desired, the lug 8 may be brazed into the inner air seal 1 concurrently with the honeycomb 7 for additional processing cost reduction.

The anti-rotation device of the present invention provides a number of advantages. For example, as a result of the anti-rotation device, the spring can only be assembled when oriented correctly. This is important since there are cutouts in the spring surface that must align with splits in the stator inner shroud. The anti-rotation device prevents rotation of the inner air seals 1 and damper springs 2 in either direction relative to the stator assembly. The anti-rotation device proofs the inner air seal to the stator clusters such that the assembly will only fit together with the inner air seal and stators oriented correctly. The anti-rotation device does not remove spring material from beneath the more highly stressed end vanes in the assembly since the anti-rotation feature damper slot is beneath the inner less highly stressed vanes.

The anti-rotation device of the present invention anti-rotates both the damper spring and the inner air seal in both directions using a single lug to cover both functions. Alternative configurations that anti-rotate at the segment ends require features at both ends of the segments to perform the same function and therefore increase cost.

The anti-rotation device of the present invention aids the assembly of the stators over the damper springs and inner air seals. During assembly, the damper springs are compressed into the cavity between the stator and the inner air seal. The stators need to be forced from the ends to overcome the friction due to the radial pressure of the damper springs. Since the anti-rotation feature of the present invention is located central to the arc, each segment needs to travel over only half of the arc length before it is seated correctly. Alternative configurations are anti-rotated at the ends and have to be assembled over the full arc length of the inner air seal segment.

It is apparent that there has been provided in accordance with the present invention an inner air seal anti-rotation device which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A stator assembly comprising:

a number of stator cluster assemblies arranged in a full ring and fitted into an inner case;

each stator cluster assembly having an inner air seal, a damper spring, and a plurality of stator clusters assembled over the damper spring and the inner air seal;

each stator cluster assembly further having a centrally located means for preventing rotation of said damper spring and said inner air seal relative to the stator clusters; and said rotation preventing means comprises a lug positioned within a slot at a center of an inner air seal arc segment, said lug engaging a slot in said damper spring and a cutout in a stator cluster.

2. A stator assembly according to claim 1, wherein said lug has a T-shaped profile and said slot is T-shaped.

3. A stator assembly according to claim 1, wherein said lug is brazed to said inner air seal.

4. A stator assembly according to claim 1, wherein said lug protrudes radially outboard from a surface of said inner air seal to engage said slot in said damper spring.

5. A stator assembly according to claim 1, wherein said lug protrudes axially forward through an inner air seal front face to engage in said cutout and is trapped between two of said stator clusters.

* * * * *